United States Patent [19]
Irwin

[11] 3,890,843
[45]* June 24, 1975

[54] LIQUID SAMPLING

[75] Inventor: Malcolm F. Irwin, West Chester, Pa.

[73] Assignee: Pro-Tech Inc., Malvern, Pa.

[ * ] Notice: The portion of the term of this patent subsequent to Jan. 29, 1990, has been disclaimed.

[22] Filed: Jan. 28, 1974

[21] Appl. No.: 437,530

Related U.S. Application Data

[63] Continuation-in-part of Ser. No. 341,319, March 14, 1973, Pat. No. 3,788,145.

[52] U.S. Cl. .............................. 73/421 B; 417/147
[51] Int. Cl. .............................................. G01n 1/14
[58] Field of Search .......... 73/421 B; 417/118, 120, 417/137, 143–147; 138/46

[56] References Cited
UNITED STATES PATENTS
2,664,111  12/1953  Piros ..................................... 138/46
3,788,145  1/1974  Irwin ................................. 73/421 B

FOREIGN PATENTS OR APPLICATIONS
570,475  1/1924  France .............................. 417/143

*Primary Examiner*—S. Clement Swisher
*Attorney, Agent, or Firm*—Charles A. McClure

[57] ABSTRACT

Equipment for sampling liquid at intervals controllable by adjusting the rate of accumulation of sample-propulsion fluid is provided with means for extending the intervals at which samples are taken and the duration of the taking of such samples. A pressure-responsive switching valve effective to interconnect accumulated propellant to a sampling locus in the liquid at a given accumulated pressure is partially shielded from sensing the pressure drop resulting from such interconnection by insertion of a fluidic delay line, thus extending the period required for the pressure to reaccumulate to the switching level. The range from shortest to longest sampling interval is adjustable by varying the degree of such shielding.

5 Claims, 1 Drawing Figure

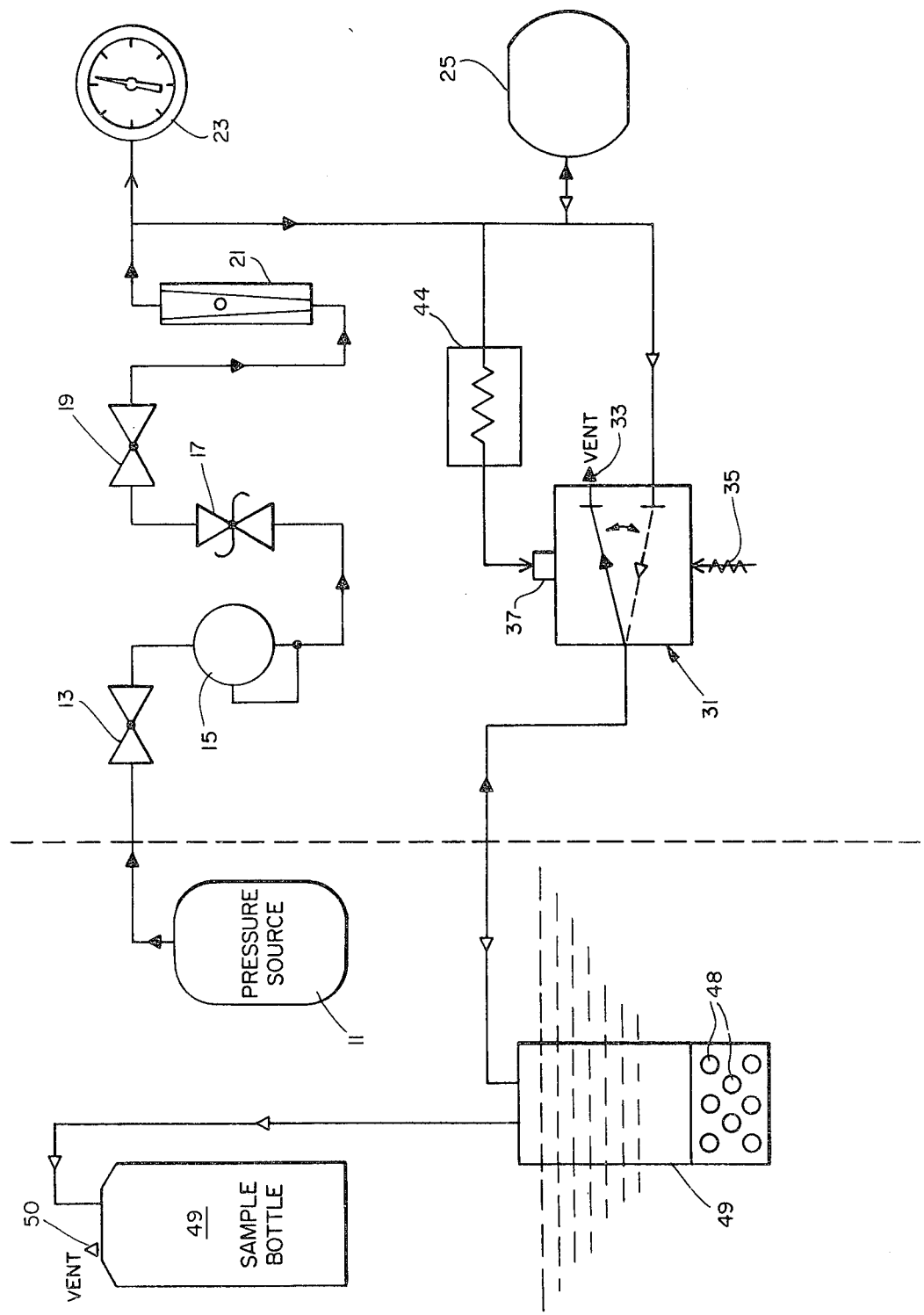

LIQUID SAMPLING

This is a continuation-in-part of my copending application, Ser. No. 341,319 filed 14 Mar. 1973 and scheduled to issue as U.S. Pat. No. 3,788,145.

This invention relates to sampling of a liquid medium such as for determination of the composition thereof or of contaminants therein, concerning especially apparatus for doing so at the instance of pressurized fluid.

Manual techniques for sampling a body of liquid for analysis or related purposes are giving way to automatic sampling, usually electrically operated. Devices for setting frequency of sampling include spring-driven and electrical timing devices. Electrical operation is hazardous in an explosive atmosphere, such as may be encountered in oil refineries and other industrial operations, in sewers and sewage treatment plants, and in pollution-ridden areas. Electrical power lines are not available at remote sampling sites, and batteries often are cumbersom or otherwise unsatisfactory. Spring-winding is inconvenient, and spring motors are a source of maintenance requirements, especially in corrosive atmospheres.

The foregoing disadvantages can be obviated by utilizing fluid under superatmospheric pressure not only to propel samples of liquid from the body thereof but also to determine the intervals at which such samples will be so propelled. An arrangement of apparatus for doing so is disclosed in U.S. Pat. No. 3,720,109, wherein accumulation of such fluid is controlled by flow-regulating means, and a normally closed pressure-responsive switching valve interposed between an accumulator or surge tank for such fluid and the sampling locus in the body of liquid is adapted to open at a given accumulated pressure, whereupon the accumulated fluid propels a sample of liquid from a sample intake chamber in the body of liquid to a collection container at another location. The switching valve recloses after enough of the accumulated fluid is discharged to lower the pressure to a level determined by the valve construction, thereby determining the sampling interval between successive samples, at any given setting of the flow regulating means, as well as the duration of individual samplings. The greater the pressure drop, the longer the sampling interval and duration, other conditions being unchanged, but the pressure decrement from open to closed positions of the switching valve is a function of the valve structure and not readily variable.

Means and methods of controlling such sampling interval and duration are disclosed in Rutkowski and Thompson patent applications Ser. No. 214,822 filed 4 Jan. 1972 and Ser. No. 237,400 filed 23 Mar. 1972, utilizing a plurality of pressure-responsive switching valves of somewhat different construction and operation but functioning similarly to that disclosed in the aforementioned patent. However, there is a need for simpler control, especially for the purpose of lengthening the sampling interval or decreasing the sampling repetition rate, simply and economically.

A primary object of the present invention is to increase the maximum sampling interval in liquid-sampling apparatus in which sample timing as well as sample propulsion is accomplished by fluid at superatmospheric pressure.

Another object of this invention is adjustment of the range of sampling intervals in such apparatus.

A further object is provision of apparatus improvements for accomplishing the foregoing objects.

Other objects of this invention, together with means and methods of attaining the various objects, will be apparent from the following description and the accompanying diagram of an embodiment of the invention, which is presented by way of example rather than limitation.

The single FIGURE of the drawing is a schematic representation of the invention.

In general, the objects of the present invention are accomplished, in the sampling of liquid from a body thereof, with apparatus including means for accumulating propellant fluid at a given rate from a source thereof under superatmospheric pressure and normally closed switching valve means between the accumulating means and a sampling locus in the body of liquid, the valve means having a pressure-sensing line connected to the accumulating means and being adapted to open at a given actuating pressure and to reclose at a given decrement in pressure sensed thereby, by fluid-impeding means located in the pressure-sensing line and effective to reduce the rat of pressure drop therein upon actuation and thus to increase the open time of the valve means for a given pressure decrement. More particularly, the impeding means comprises a fluidic delay line.

The drawing shows diagrammatically components of such sampling apparatus to the right, and other components to the left, of a vertical broken line. The latter components include source of propellant fluid under pressure (PRESSURE SOURCE) 11, sample intake chamber 21 immersed in water, and sample collection container (SAMPLE BOTTLE) 25, the latter two of which are directly connected together. Arrowheads show the direction and kind of flow: solid triangular arrowheads for first-condition flow, hollow triangular arrowheads for second-condition flow, and barbed arrowheads for application of pressure at low or no flow (both conditions). The first condition corresponds to the normally biased position of pressure-responsive switching valve 31, and the second condition corresponds to the switched position thereof.

Conduits or lines connect from source 11 of propellant in succession to on-off flow-regulator 13, pressure regulator 15, safety valve 17, adjustable flow-regulator 19 for flow-meter or ratemeter 21, past gauge 23, and to accumulator or surge tank 25. A line connects from pressure-responsive switching valve 31 to sample intake chamber 47, which is connected in turn to sample bottle 49, but the valve is closed thereto in this first condition, and the sample intake chamber is vented through vent 33 thereof (solid arrow) as is necessary to admit a liquid sample to the chamber. The switching valve is biased into the first condition by spring 35 (indicated schematically with upwardly directed barbed arrow, underneath the switch body). Fluid pressure applied to pressure-sensing element or piston 37 of the valve (as indicated by downwardly directed barbed arrow thereabove) is available from the tank through intervening impeding means in the form of fluidic delay line 44.

Sample intake chamber 47 has a check valve (not shown) therein between intercommunication of the interior and opening 48 for admitting liquid thereinto. The inlet line from switching valve 31 thereinto has a dip tube (also not shown) extending downwardly into the chamber interior. Details of such a chamber appear in FIG. 6 and related description of U.S. Pat. No. 3,720,109.

Operation of the apparatus according to this invention is readily understood. As propellant flows from source 11 to accumulator tank 25 at a rate controlled by the setting of flow-regulator 19 and indicated by float position in meter 21, the pressure increases (as shown on gauge 23) and tends to overcome the bias of spring 35 and to switch piston 37 of valve 31 from the normally closed (but vented) first condition to the second condition, in which the valve establishes a flow path (broken arrow with hollow head) from the tank to sample intake chamber 47 (vent 33 closed). When the switch opens, flow of propellant already accumulated in the tank forces the liquid sample from the chamber into sample bottle 49, excess propellant escaping through vent 50 therein.

The outflow of propellant reduces the pressure in tank 25 (notwithstanding the continuing flow from the source, which is at a much lower rate), and the pressure at valve piston 37 drops also. However, delay line 44 shields the valve temporarily from the full pressure decrement by limiting the escape of fluid therethrough back toward the tank. This prolongs the period during which the valve is open and, thus, results in a lower tank pressure when the valve recloses, which it does at a piston pressure determined by the valve construction. The interval required for flow from the source to return the tank to the valve switching pressure is lengthened thereby beyond what it would have been if the piston had stayed in step with the tank during the pressure drop.

It will be understood that the delay line may be simply a suitable length (e.g., 10 to 50 feet) of small-bore tubing (e.g., 1/10 inch to 1/20 inch inside diameter) wound helically, as shown diagrammatically herein, or may take any equivalent form. A 25-foot length of 1/16 inch I.D. (1/8 inch O.D.) plastic tubing wound on a conventional solder spool has proved satisfactory. Taps therefrom at different length intervals may be employed, together with means for switching from one to another, so as to facilitate adjustment of effective line length, if desired. This is an alternative to the arrangement disclosed in my aforementioned patent—in which a restrictor (preferably adjustable) was so connected, preferably with unidirectional non-impeding (toward the valve) means connected in parallel therewith—and is preferred thereover for economy, freedom from clogging, and related reasons. Any such arrangement constitutes a substantial improvement over the prior art lacking it.

Whereas a particular apparatus embodiment and certain modifications therein have been described, other modifications may be made, as by addition, combination, or division of parts or steps, or by substitution of equivalents therefor, while retaining at least some of the advantages and benefits of the invention, which itself is defined in the following claims.

The claimed invention:

1. In apparatus for sampling liquid from a body thereof, including means for accumulating propellant fluid at a given rate from a source thereof under super-atmospheric pressure and normally closed switching valve means between the accumulating means and a sampling locus in the body of liquid, the valve means having a pressure-sensing line connected to the accumulating means and being adapted to open at a given actuating pressure and to reclose at a given decrement in pressure sensed thereby, improved fluid-impeding means located in the pressure-sensing line, being effective to reduce the rate of pressure drop therein upon actuation and thus to increase the open time of the valve means for a given pressure decrement and comprising a fluidic delay line.

2. Apparatus according to claim 1, wherein the delay line comprises helically wound tubing.

3. In liquid sampling wherein pressurized fluid from a source thereof is utilized to propel successive samples of liquid from a body thereof at desired intervals, and wherein fluid from such source is accumulated temporarily at increasing pressure, and the flow is regulated between the source and the accumulation location until reaching a predetermined switching level of fluid pressure at the accumulation location, whereupon the accumulated fluid is released to propel a sample of liquid as aforesaid, and wherein the accumulation of fluid is resumed at a lower predetermined level of fluid pressure thereat, the improvement comprising delaying the sensing of such pressure decrement temporarily upon releasing the fluid for consequent flow of accumulated fluid to the sampling locus to propel a sample therefrom.

4. Liquid sampling according to claim 3, wherein the delaying is accomplished by impeding the flow of of fluid between the accumulation location and pressure-sensing location.

5. Liquid sampling according to claim 3, wherein the delay time is adjustable, and including the step adjusting it.

* * * * *